United States Patent
Torres et al.

(10) Patent No.: US 7,553,255 B2
(45) Date of Patent: Jun. 30, 2009

(54) LOCKER CLUTCH CONTROL FOR A DIFFERENTIAL MECHANISM

(75) Inventors: Joe J. Torres, Dearborn, MI (US); John O'Rear, Whitmore Lake, MI (US); Peter J. Barrette, Ann Arbor, MI (US); Patrick Meloche, Northville, MI (US); Dana J. Katinas, Novi, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 505 days.

(21) Appl. No.: 11/580,663

(22) Filed: Oct. 13, 2006

(65) Prior Publication Data

US 2008/0090688 A1    Apr. 17, 2008

(51) Int. Cl.
  *B60W 10/04* (2006.01)
  *B60W 10/12* (2006.01)
(52) U.S. Cl. .................... 477/35; 477/904; 180/249
(58) Field of Classification Search ................ 477/35; 180/250; 701/89
See application file for complete search history.

(56) References Cited

U.S. PATENT DOCUMENTS

| 4,623,976 | A | | 11/1986 | Carp et al. |
|---|---|---|---|---|
| 4,681,185 | A | | 7/1987 | Hoernig et al. |
| 4,825,368 | A | * | 4/1989 | Itoh et al. ................. 701/69 |
| 5,033,329 | A | * | 7/1991 | Tezuka ..................... 477/35 |
| 5,562,192 | A | | 10/1996 | Dick |
| 5,620,240 | A | | 4/1997 | Tuck et al. |
| 5,927,422 | A | | 7/1999 | Schakel |
| 6,083,134 | A | | 7/2000 | Godlew |
| 6,241,326 | B1 | | 6/2001 | Ferguson et al. |
| 6,345,229 | B1 | | 2/2002 | Honkomp et al. |
| 6,959,970 | B2 | | 11/2005 | Tseng |
| 7,022,040 | B2 | | 4/2006 | DeGowske et al. |
| 2003/0168274 | A1 | * | 9/2003 | Lee et al. .................. 180/197 |
| 2005/0288842 | A1 | | 12/2005 | Brewer et al. |
| 2006/0122032 | A1 | | 6/2006 | Heier et al. |

\* cited by examiner

*Primary Examiner*—Charles A Marmor
*Assistant Examiner*—Edwin A. Young
(74) *Attorney, Agent, or Firm*—David B. Kelley; MacMillan, Sobanski & Todd, LLC

(57) ABSTRACT

A motor vehicle driveline that can transmit power in a 4×4 mode includes two front wheels, a rear drive shaft, a differential mechanism for transmitting power to two rear axle shafts connected driveably through the differential to the rear driveshaft, and a clutch for engaging and disengaging a drive connection in the differential mechanism. A method for controlling operation of the clutch includes the steps of operating the driveline in 4×4 mode, determining a current accelerator pedal position, determining whether a current accelerator pedal position is less than a reference position for a predetermined period, determining a current speed of each front wheel of the vehicle, determining whether a current speed difference between the front wheels of the vehicle is less than a reference wheel slip for a first predetermined period, determining during a second predetermined period whether a current time rate of speed change of the rear drive shaft is less than a reference rear wheel slip. The clutch is prevented from being engaged if either the speed difference exceeds the reference speed difference, or the time rate of speed change of the rear drive shaft is greater than a reference rear wheel slip. Otherwise, the clutch is engaged.

19 Claims, 4 Drawing Sheets

LOCKER CLUTCH CONTROL FOR A DIFFERENTIAL MECHANISM

BACKGROUND OF THE INVENTION

1. Field of the Invention

The invention relates generally to a differential mechanism, which transmits rotating power to the wheels of a motor vehicle.

2. Background of the Art

A locker clutch can be used to secure one of the side gears and its axle shaft against rotation relative to the differential carrier, thereby enhancing traction of the driven wheels that are supplied with power through the differential mechanism.

A four-channel anti-lock brake system (ABS) provides a speed sensor at each wheel of the vehicle for monitoring its rotating speed and producing an electric signal representing the speed. A three-channel ABS provides two wheel speed sensors for monitoring and signaling the rotating speed of each front wheel, and a speed sensor for monitoring and signaling the speed of the rear drive shaft. According to current industry standards, engagement of the differential locker clutch typically occurs only when the vehicle is operating in the 4×4 LOW mode and at low vehicle speed, usually below five kph.

Often, in a vehicle equipped with no electronic stability control (ESC) system, the rear axle is only equipped with one speed sensor, which monitors and signals the speed of the rear drive shaft. The additional cost required to provide an ESC axle on a vehicle that otherwise has no ESC system is prohibitive, yet accurate monitoring of each individual ABS wheel speed sensor is essential for engagement of a differential locker system, NVH requirements, damage prevention of both the locker and the axle shafts, and failure mode control and communication to the vehicle operator.

There is a need, therefore, to ensure safe and reliable operation of a locker clutch system regardless of whether it is housed in a single-channel or a dual-channel rear axle in a vehicle having no RSC capability.

There is a need also for a differential locker clutch control that provides enhanced vehicle traction and on-the-fly engagement at vehicle cruising speeds, and operates in the 4×4 HIGH mode in vehicles with both 3-channel and 4-channel ABS, while minimizing unnecessary electric current draw.

SUMMARY OF THE INVENTION

Electronic locking differential control strategy automatically adapts to three-channel and four-channel ABS systems. The control correctly models rear axle shaft speed behavior by monitoring channels that provide operating information regarding 4×4 system operation, accelerator pedal position, rate of change of rear driveshaft speed, and LH and RH front halfshaft speed changes. Upon initialization of the 4×4 module, the control refers to a high speed CAN bus and monitors a specific ABS message, which tells receivers whether a 3-channel or 4-channel ABS system is installed. It then addresses 4×4 calibratable parameters developed specific to each system, and refers to those values during operation.

In a preferred embodiment, the control allows on-the-fly engagement at cruising speeds, permits usage in 4×4 HIGH operating mode, and minimizes driveline weight in vehicles that are not equipped with ESC systems.

Because the control can actuate the differential locker clutch with a pulse width modulated (PWM) signal, less electric current is required to control the locker clutch than in a conventional control. Through PWM, current draw can be optimized by providing a strong enough magnetic field to allow for adequate engagement, yet avoiding full electrical saturation of the locker's electromagnetic coil. This electric energy saving advantage is an important feature in vehicles having marginal electric charging capacity.

A motor vehicle driveline that can transmit power in a 4×4 mode includes two front wheels, a rear drive shaft, a transfer case, a differential mechanism for transmitting power to two rear axle shafts connected driveably through the differential to the rear driveshaft, and a clutch for engaging and disengaging a drive connection in the rear axle differential mechanism. A method for controlling operation of the clutch includes the steps of operating the driveline in 4×4 mode, determining driver demanded torque via accelerator pedal position, determining a current speed of each front wheel of the vehicle, determining whether a current speed difference between the front wheels of the vehicle is less than a reference wheel slip for a first predetermined period, determining during a second predetermined period whether a current time rate of speed change of the rear drive shaft is less than a reference rate of speed change. The clutch is prevented from being engaged if the accelerator pedal position exceeds the reference value, side-to-side front wheel speed difference exceeds the reference speed difference, and the time rate of speed change of the rear drive shaft is greater than a reference rear wheel slip. Otherwise, the clutch is engaged.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
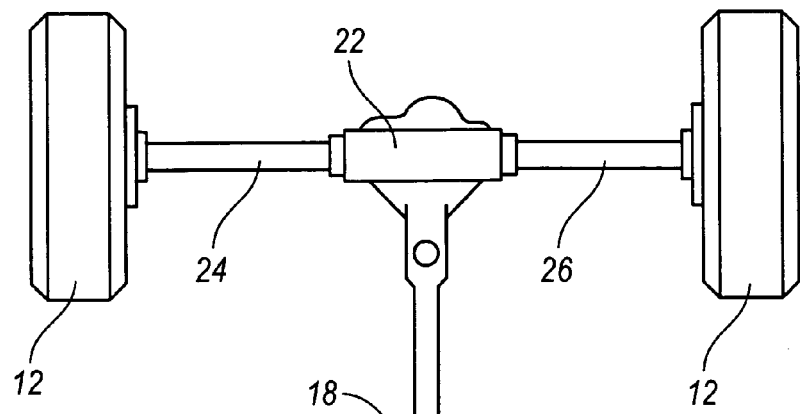
FIG. 1 is a plan view of a motor vehicle driveline, which includes a transmission, transfer case, front and rear drive shafts, and shafts extending to front wheels and rear wheels.
Figure 1:
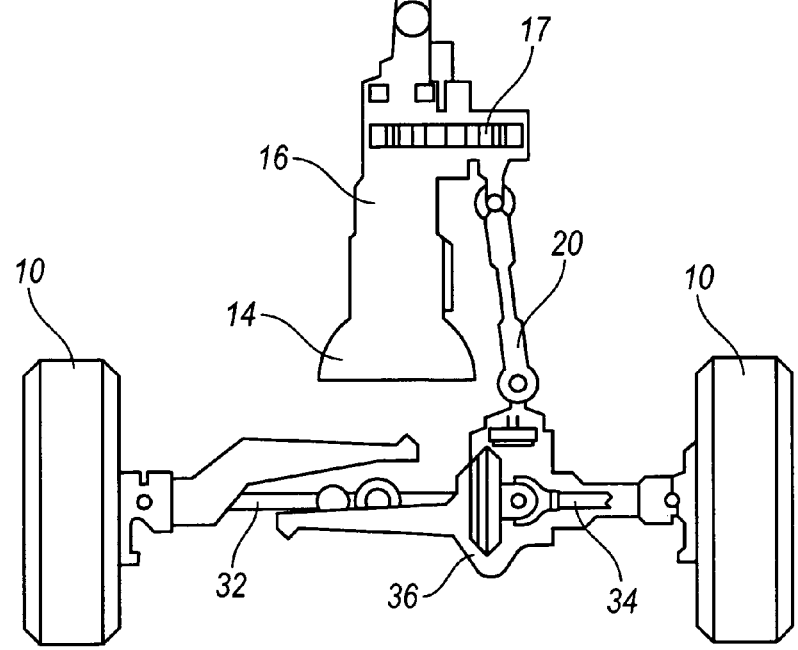

Referring to the drawings particularly to FIG. 1, the powertrain of a motor vehicle, to which the present invention can be applied, includes front and rear wheels 10, 12, a torque converter 14 driveably connected to an engine output and to a transmission input, a power transmission 16 for producing multiple forward and reverse speed ratios, and a transfer case 17 for continuously driveably connecting the transmission output to a rear drive shaft 18. The transfer case 17 selectively connects the transmission output to both the front drive shaft 20 and rear drive shaft 18 when a four-wheel drive mode of operation is selected, either manually or electronically. Rear drive shaft 18 transmits power to a rear axle housing 22, containing a differential mechanism from which power is transmitted differentially to the rear wheels 12 through axle shafts 24, 26. The rear axle shafts 24, 26 extend laterally outward to the rear wheels 12. The front wheels are driveably connected to right-hand and left-hand halfshafts 32, 34, to which power is transmitted from the front drive shaft 20 through a front differential mechanism 36.

The transfer case assembly 17 continually transmits rotating power to the rear driveshaft 18 and rear wheels 12, which is the primary power path. The transfer case 17 intermittently transmits rotating power to the front driveshaft 20 and the front wheels 10, which is the secondary power path, when a clutch 42 located in the transfer case 17 is actuated.

Figure 2:
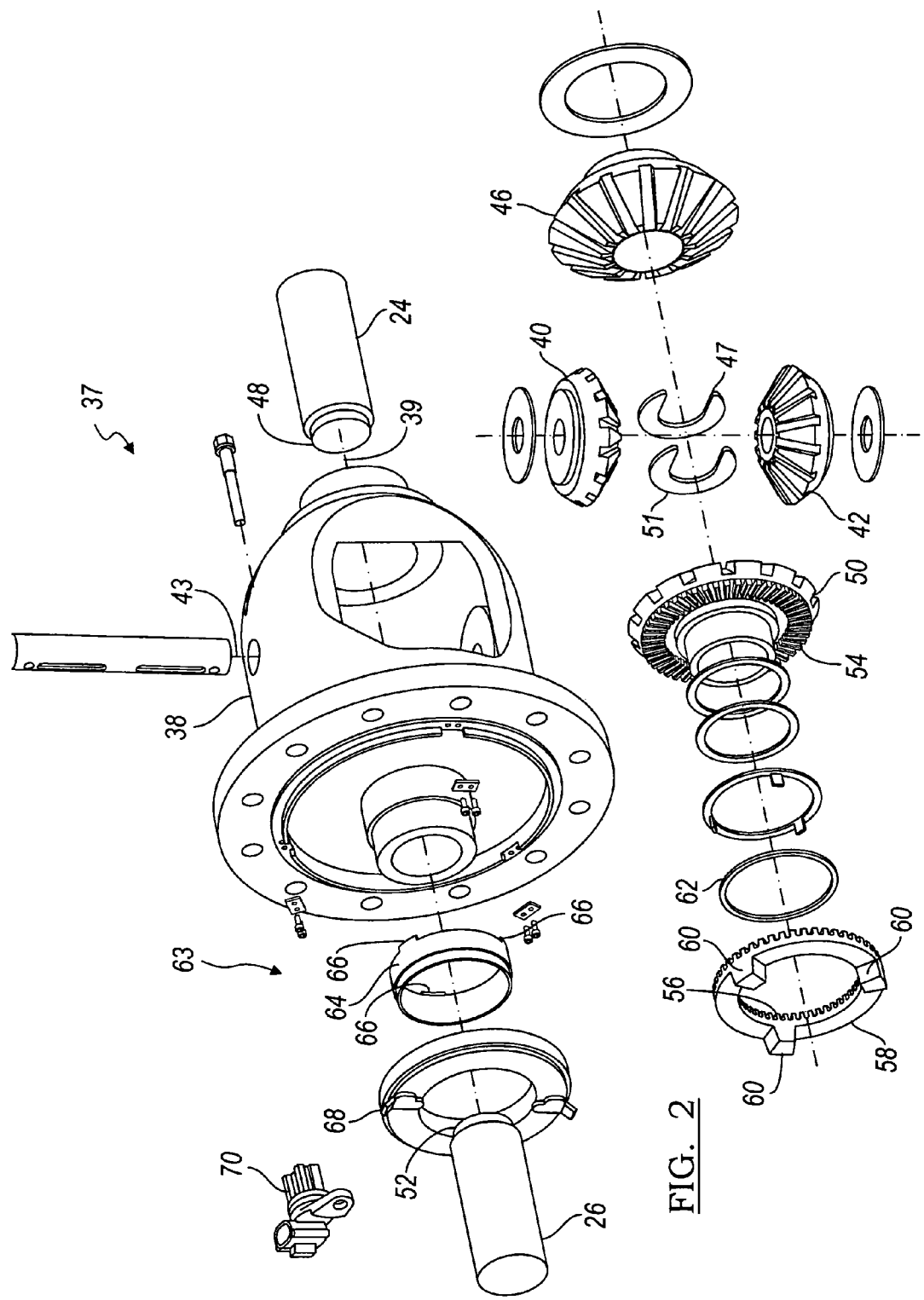
FIG. 2 is a schematic diagram of a system for locking a differential mechanism that transmits torque to lateral axle shafts.

Referring to FIG. 2, the differential mechanism 37 for transmitting power differentially to the left-side and right-side axle shafts 26, 24 is contained in the rear axle housing 22. The differential mechanism 37 includes a ring gear (not shown) driveably connected to the rear driveshaft 18 and secured to a differential case or carrier 38, which rotates about a lateral axis 39. Bevel pinions 40, 42 are secured to the carrier 38 by a differential pin 44, revolve about axis 39 as the carrier rotates, and rotate about the axis 43 of pin 44. A right-side bevel gear 46 meshes with bevel pinions 40, 42 and is secured by a spline to axle shaft 24 for rotation with the shaft as a unit. A snap ring 47 seated in a recess 48 establishes the axial position of gear 46 on shaft 24. A left-side bevel gear 50 meshes with the bevel pinions 40, 42 and is secured by a spline to axle shaft 26 for rotation with the shaft as a unit. A snap ring 51 seated in a recess 52 establishes the axial position of side gear 50 on shaft 26. The side bevel gears 46, 50 driveably connected to the right-side axle shaft 24 and left-side axle shaft 26, respectively, each axle shaft being drivable connected to a wheel 12 of the vehicle.

The lateral outer face of side gear 50 is formed with dog teeth 54, which are able to engage dog teeth 56 formed on the inner later face of a cam ring 58. The cam ring 58 is secured to the carrier 38 against rotation by bosses 60 formed on the outer lateral face of the cam ring and spaced angularly about axis 39. The bosses 60 engage and disengage recesses formed on an inner surface of the carrier 22 as the cam ring moves axially. A return spring 62 urges cam ring 58 away from engagement with the side gear 50 and toward engagement with the carrier 22.

The locker clutch 63 includes a plunger ring 64, located outside of the carrier 22, and plunger ring extensions 66, which extend through the carrier and into alignment with the bosses 60. A coil 68, supplied with electric current through a connector, produces an electromagnetic force when energized, which forces the plunger 64 axial toward the cam ring 60, thereby engaging clutch 13. This causes the dog teeth 56 on cam ring 60 to engage the dog teeth 54 on the side gear 50, thereby driveably connecting axle shaft 26 and its side gear 50 to carrier 22. When the coil is deenergized, clutch 63 becomes disengaged due to the electromagnetic force being removed and spring 62 returning the cam ring 58 to its disengaged location.

Figure 3:
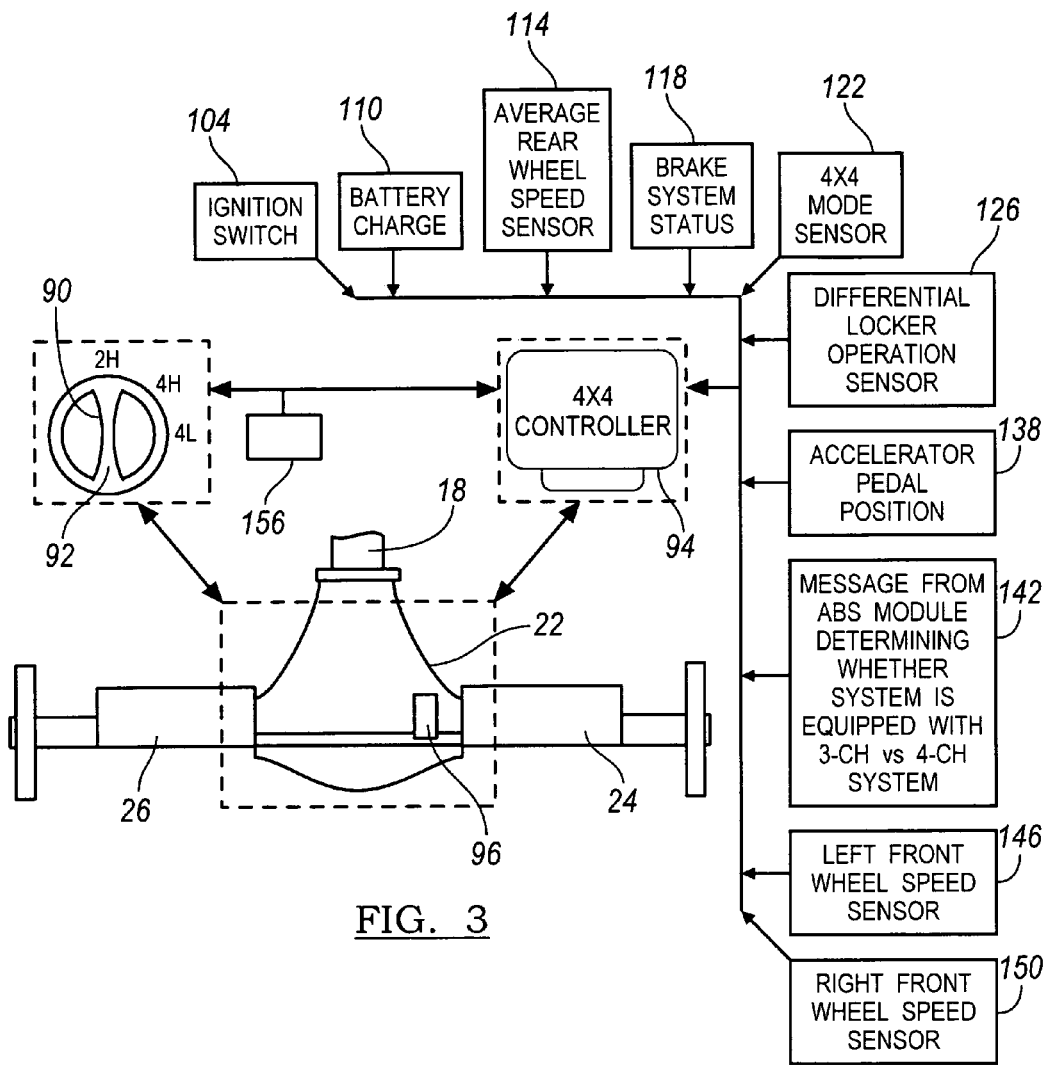
FIG. 3 is a cross section showing a differential mechanism and its electrically-actuated locker clutch.

FIG. 3 illustrates portions of a system for controlling selective actuation of a locker clutch 63 by energizing and deenergizing its actuating coil 68. The vehicle operator manually operates a rotary 4×4 mode select switch 90 to select among 4×2 high (2H), 4×4 high (4H) and 4×4 low (4L) operation, wherein "H" or "high" indicates that the transfer case produces a high speed output relative to the speed of its input, and "L" or "low" indicates that the transfer case produces a low speed output relative to the speed of its input. The dial 92 of switch 90 is pulled toward the operator to engage the electric lock control feature of the differential mechanism 22. A controller 94, switch 90, other sensors and actuator coil 68 communicate via CAN messages using a universal bus protocol.

Figure 4:
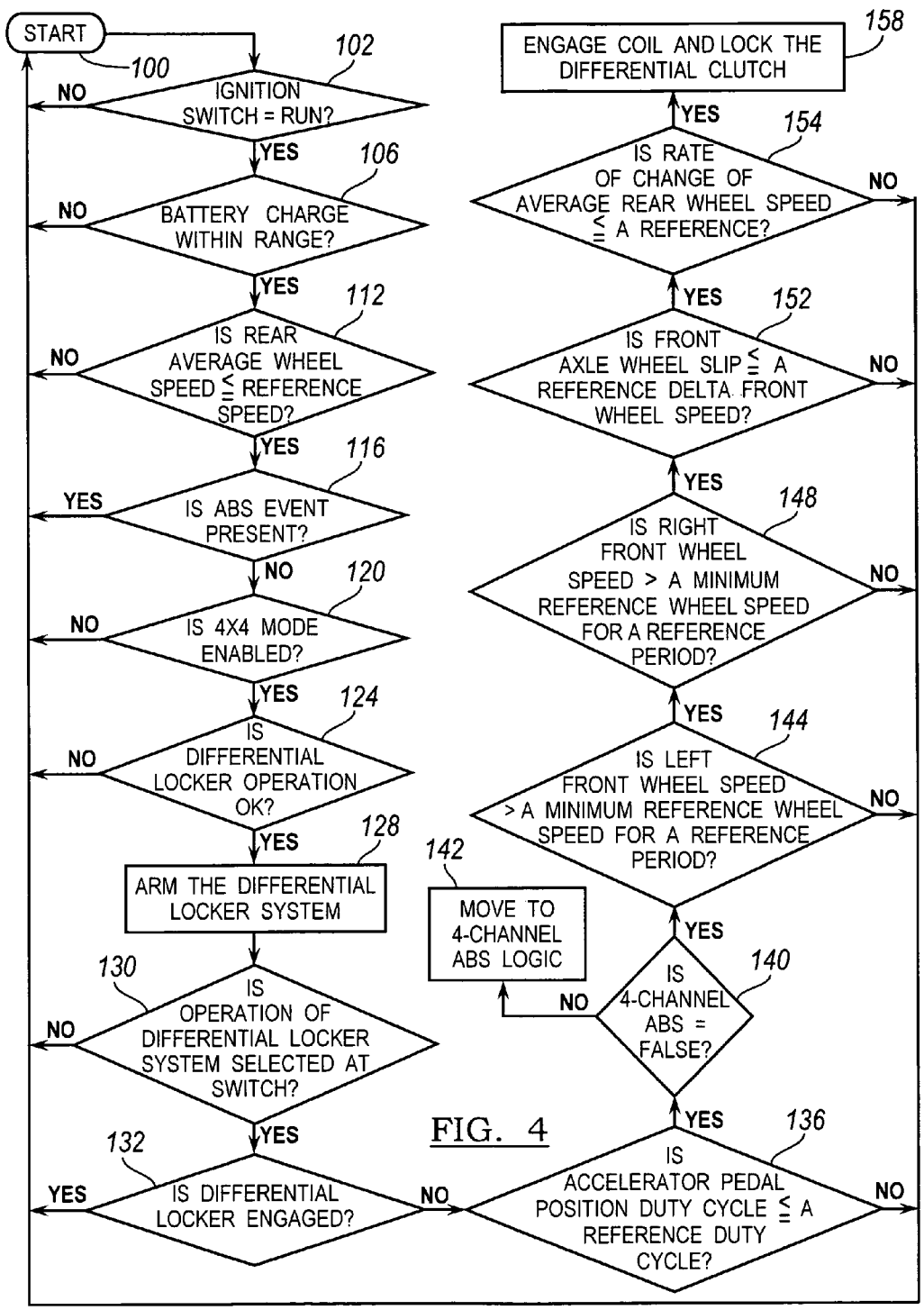
FIG. 4 is a logic diagram illustrating method steps for controlling actuation of a locker clutch in the differential mechanism.

FIG. 4 illustrates the steps of a method for controlling actuation of the of the locker clutch 63 by energizing and deenergizing its actuating coil 68. Preferably the ELD control is inoperative in the 2L mode. If the driveline is operating in 4×4 mode, which may be selected by the operator rotating dial 92 of switch 90 to the 4H or 4L positions, and the electric locker differential (ELD) control is selected by the operator pulling dial 92 rearward, and an inferred rear wheel speed difference is present, then engagement of clutch 63 is prevented unless the inferred speed difference is at or below a reference speed difference.

The EDL control algorithm is entered at step 100, whereupon several logic tests are made for the presence of certain initial conditions. At step 102 a test is made to determine whether the engine ignition switch 104 is in the RUN position. If the test at step 102 is logically false, the control algorithm returns to step 100. But if the test at step 102 is logically true, the control algorithm advances to step 108 after determining the charge status 110 of the vehicle's battery.

At step 106 a test is made to determine whether the voltage output of the battery is within a desired range. If the test at step 106 is logically false, the control algorithm returns to step 100. But if the test at step 106 is logically true, the control algorithm advances to step 112 after checking a signal produced by a speed sensor 114 representing the speed of rear driveshaft 18.

At step 112 a test is made to determine whether the speed of rear driveshaft 18 output by speed sensor 114 is less than a reference rear driveshaft speed, preferably about 40 kph. If the test at step 112 is logically false, the control algorithm returns to step 100. But if the test at step 112 is logically true, the control algorithm advances to step 116 after determining from a signal produced by the vehicle's brake system 118, preferably an anti-lock brake system, the status of a brake event.

At step 116 a test is made to determine whether an ABS event is present that would prevent engagement of the differential locker clutch 63. If the test at step 116 is logically true, the control algorithm returns to step 100. But if the test at step 116 is logically false, the control algorithm advances to step 120 after checking a signal produced by a 4×4 mode sensor 122.

At step 120 a test is made to determine whether sensor 122 indicates the locker mode arm is enabled. If the test at step 120 is logically false, the control algorithm returns to step 100. But if the test at step 120 is logically true, the control algorithm advances to step 124 after checking a signal produced by the locker operation sensor 126 indicating whether a failure is present that would prevent the differential locker system from functioning correctly.

At step 124 a test is made to determine whether the differential locker system is functioning properly. If the test at step 124 is logically false, the control algorithm returns to step 100. But if the test at step 124 is logically true, the control algorithm advances to step 128 where the differential locker system is armed, i.e., the system is enabled to lock the differential upon issuance of a command signal from controller 94. Next, a series of tests are made to ensure that the differential can be locked safely, i.e., avoiding failure in the driveline. At step 130 a test is made to determine whether a signal produced by a sensor in the mode switch 90 indicates that operation of the differential locker system is selected. If the test at step 130 is logically false, the control algorithm returns to step 100.

But if the test at step 130 is logically true, the control algorithm advances to step 132 after checking a signal produced by a differential locker engagement sensor 96.

At step 132, a test is made to determine whether the differential locker is engaged. If the test at step 132 is logically true, the control algorithm returns to step 100. But if the test at step 132 is logically false, the control algorithm advances to step 136 after checking a signal produced by an engine throttle position sensor 138.

At step 136, a test is made to determine whether the engine throttle duty cycle is less than a reference TP duty cycle, which is the maximum TP at which the differential clutch 63 should be locked. If the test at step 132 is logically false, the control algorithm returns to step 100. But if the test at step 132 is logically true, indicating that the driver demanded torque is not excessive, the control algorithm advances to step 140 after checking a signal produced by an ABS module sensor 142 representing the operative status of the ABS system.

At step 140, a test is made to determine whether the vehicle is equipped with 3-channel or 4-channel ABS. If the test at step 140 is logically true, the control algorithm advances to step 144. But if the test at step 140 is logically false, indicating that the vehicle has no operative ESC system, the control algorithm moves to step 142 where 4-channel ABS logic is used. The control advances to step 144 after checking a signal representing the left front wheel speed produced by a wheel speed sensor 146.

At step 144, a test is made to determine whether the left front (LF) wheel speed is greater than a reference wheel speed (about zero), and remains above the reference wheel speed for a predetermined period (about 2000 ms), represented by a reference number of consecutive data sample periods. It has been determined that a failure in the vehicle's driveline will not occur upon locking the differential clutch 63, provided the LF wheel speed is positive. If the test at step 144 is logically false, the control algorithm returns to step 100. But if the test at step 144 is logically true, indicating that LF wheel speed is positive, the control algorithm advances to step 148 after checking a signal representing the right front (RF) wheel speed produced by a wheel speed sensor 150.

At step 148, a test is made to determine whether the RF wheel speed is greater than a reference wheel speed (about zero), and remains above the reference wheel speed for a predetermined period (about 2000 ms), represented by a reference number of consecutive data sample periods. It has been determined that a failure in the vehicle's driveline will not occur upon locking the differential clutch 63, provided RF and LF wheel speeds are positive. If the test at step 148 is logically false, the control algorithm returns to step 100. But if the test at step 148 is logically true, indicating that RF wheel speed is positive, the control algorithm advances to step 152 after checking the current difference in speed between the front wheels 10 represented by the signals produced speed sensors 146 and 150.

The control algorithm infers rear wheel slip by equating it to the current front wheel slip, as determined from the signals produced by the front wheel speed sensors 146, 155. At step 152, a test is made to determine whether the slip between the rear wheels over a period of predetermined length (about 2000 ms, represented by a predetermined number of consecutive data sample periods) is equal to or less than a reference speed difference between the rear wheels. If the test at step 152 is logically false, the control algorithm returns to step 100. But if the test at step 152 is logically true, indicating that the current rear wheel slip does not exceed the reference rear wheel slip, the control algorithm advances to step 154 after checking a signal representing the speed of the rear driveshaft 18 produced by a wheel speed sensor 156.

At step 154, a test is made to determine whether the absolute value of the time rate of change of the rear driveshaft speed over a period of predetermined length (about 2000 ms, represented by a predetermined number of consecutive data sample periods), is equal to or less than a reference rear drive shaft speed change (preferably comparable to a vehicle speed of about 1.00-0.75 kph). If the test at step 154 is logically false, the control algorithm returns to step 100. But if the test at step 154 is logically true, indicating that the current rate of change of rear wheel speed is acceptable, the control algorithm advances to step 158.

At step 158, the controller 94 executes a command signal causing an electric current to be applied to the coil 68, which causes the differential clutch 63 to engage.

Numbers cited here and representing the magnitudes of specific variables and parameters for a particular application are calibratable and subject to wide variation in other applications of the control strategy from the magnitudes mentioned here.

References throughout the description of the control strategy and the claims to engine throttle position indicates that the motor vehicle is equipped with an electronic throttle system, in which a microprocessor controls the engine throttle opening or position as a function of vehicle speed, accelerator pedal position, the time rate of change of accelerator pedal position, and other variables, rather than by accelerator pedal position alone. However, the control strategy is applicable also to vehicles in which the engine throttle position is mechanically connected directly to the accelerator pedal. Therefore, references to "engine throttle position" are interchangeable with "accelerator pedal position."

In accordance with the provisions of the patent statutes, the preferred embodiment has been described. However, it should be noted that the alternate embodiments can be practiced otherwise than as specifically illustrated and described.

What is claimed is:

1. In a motor vehicle driveline that can transmit power in a 4×4 mode, the driveline having two front wheels, a rear drive shaft, a differential mechanism for transmitting power to two rear axle shafts connected driveably through the differential to the driveshaft, and a clutch for engaging and disengaging a drive connection in the differential mechanism, a method for controlling operation of the clutch comprising the steps of:
    (a) operating the driveline in 4×4 mode;
    (b) determining a current speed of each front wheel of the vehicle;
    (c) determining whether a current speed difference between the front wheels of the vehicle is less than a reference wheel slip for a first predetermined period;
    (d) determining during a second predetermined period whether a current time rate of speed change of the rear drive shaft is less than a reference rear wheel slip;
    (e) preventing engagement of the clutch if either of steps (c) and (d) is false; and
    (f) permitting engagement of the clutch provided steps (c) and (d) are true.

2. The method of claim 1, further comprising the steps of:
    (g) determining whether an accelerator pedal position is less than a reference accelerator pedal position;
    preventing engagement of the clutch if either of steps (c), (d) and (g) is false; and
    permitting engagement of the clutch provided steps (c), (d) and (g) are true.

3. The method of claim 1, further comprising the steps of:
(h) determining whether a speed of each front wheel is greater than a reference speed for a period of predetermined length;
preventing engagement of the clutch if either of steps (c), (d) and (h) is false; and
permitting engagement of the clutch provided steps (c), (d) and (h) are true.

4. The method of claim 1, further comprising the steps of:
producing a signal indicating that engagement of the clutch is desired before executing steps (e) and (f).

5. The method of claim 1, further comprising the steps of:
(i) determining whether a charge level of a battery is within an predetermined range;
preventing engagement of the clutch if either of steps (c), (d) and (i) is false; and
permitting engagement of the clutch provided steps (c), (d) and (i) are true.

6. The method of claim 1, further comprising the steps of:
(j) determining whether a current speed of the rear driveshaft is less than a reference driveshaft speed;
preventing engagement of the clutch if either of steps (c), (d) and (j) is false; and
permitting engagement of the clutch provided steps (c), (d) and (j) are true.

7. The method of claim 1, further comprising the step of:
producing a signal indicating that the clutch is not currently engaged before executing steps (e) and (f).

8. The method of claim 1, further comprising the step of:
producing a signal indicating that a vehicle roll stability control system is inoperative before executing steps (e) and (f).

9. A system for controlling operation of a clutch that alternately opens and closes a drive connection in a motor vehicle driveline, comprising:
a power source;
primary wheels driveably connected to the power source;
a transfer case including an input driveably connected to the power source and an output, for alternately driveably connecting and disconnecting the power source and secondary wheels;
a driveshaft connected to the transfer case output;
a differential mechanism containing the clutch, which alternately opens and closes a drive connection in the differential mechanism, including an input connected to the driveshaft, and an output that transmits power differentially to the secondary wheels; and
an actuator for operating the clutch to open and close said drive connection;
a controller determining a current speed of each front wheel of the vehicle, determining whether a current speed difference between the front wheels of the vehicle is less than a reference wheel slip for a first predetermined period, determining during a second predetermined period whether a current time rate of speed change of the rear drive shaft is less than a reference rear wheel slip, preventing the actuator from closing said drive connection if either the speed difference exceeds the reference speed difference or the time rate of speed change of the driveshaft is greater than a reference wheel slip, and energizing the actuator to close said drive connection provided the speed difference is less than the reference speed difference and the time rate of speed change of the driveshaft is less the reference wheel slip.

10. The system of claim 9, wherein the controller further comprises:
determining whether an engine throttle position is less than a reference throttle position, preventing the actuator from closing said drive connection if the engine throttle position is greater than a reference throttle position, and energizing the actuator to close said drive connection provided the engine throttle position is less than the reference throttle position.

11. The system of claim 9, wherein the controller further comprises:
determining whether a speed of each primary wheel is greater than a reference speed for a period of predetermined length, preventing the actuator from closing said drive connection if the speed of each primary wheel is less than a reference speed for a period of predetermined length, and energizing the actuator to close said drive connection provided the speed of each primary wheel is greater than a reference speed for a period of predetermined length.

12. The system of claim 9, wherein the controller further comprises:
producing a signal indicating that engagement of the clutch is desired.

13. The system of claim 9, wherein the controller further comprises:
determining whether a charge level of a battery is within a predetermined charge range, preventing the actuator from closing said drive connection if the charge level of a battery is not within the charge predetermined range, and energizing the actuator to close said drive connection provided the charge level of a battery is within the charge predetermined range speed.

14. The system of claim 9, wherein the controller further comprises:
determining whether a current speed of the rear driveshaft is less than a reference driveshaft speed, preventing the actuator from closing said drive connection if the current speed of the rear driveshaft is greater than the reference driveshaft speed, and energizing the actuator to close said drive connection provided the current speed of the rear driveshaft is greater than the reference driveshaft speed.

15. In a motor vehicle driveline that can transmit power in a 4×4 mode, the driveline having a first set of wheels continually driveably connected to a power source, a drive shaft, a differential mechanism for transmitting power to a second set of axle shafts connected driveably through the differential to the driveshaft, and a clutch for engaging and disengaging a drive connection in the differential mechanism, a method for controlling operation of the clutch comprising the steps of:
(a) operating the driveline in 4×4 mode;
(b) determining a current speed of each wheel of the first set of wheels;
(c) determining whether a current speed difference between the wheels of the first set of wheels is less than a reference wheel slip for a first predetermined period;
(d) determining during a second predetermined period whether a current time rate of speed change of the driveshaft is less than a reference wheel slip;
(e) preventing engagement of the clutch if either of steps (c) and (d) is false; and
(f) permitting engagement of the clutch provided steps (c) and (d) are true.

16. The method of claim 15, further comprising:
(g) determining whether an engine throttle position is less than a reference throttle position;
preventing engagement of the clutch if either of steps (c), (d) and (g) is false; and permitting engagement of the clutch provided steps (c), (d) and (g) are true.

17. The method of claim 15, further comprising the steps of:
(h) determining whether a speed of each wheel of the first set of wheels is greater than a reference speed for a period of predetermined length;
preventing engagement of the clutch if either of steps (c), (d) and (h) is false; and
permitting engagement of the clutch provided steps (c), (d) and (h) are true.

18. The method of claim 15, further comprising the steps of:
(i) determining whether a charge level of a battery is within an predetermined range;
preventing engagement of the clutch if either of steps (c), (d) and (i) is false; and
permitting engagement of the clutch provided steps (c), (d) and (i) are true.

19. The method of claim 15, further comprising the steps of:
(j) determining whether a current speed of the driveshaft is less than a reference driveshaft speed;
preventing engagement of the clutch if either of steps (c), (d) and (j) is false; and
permitting engagement of the clutch provided steps (c), (d) and (j) are true.

* * * * *